No. 733,040. PATENTED JULY 7, 1903.
P. L. T. HÉROULT.
ELECTRIC FURNACE.
APPLICATION FILED MAR. 27, 1902.
NO MODEL.
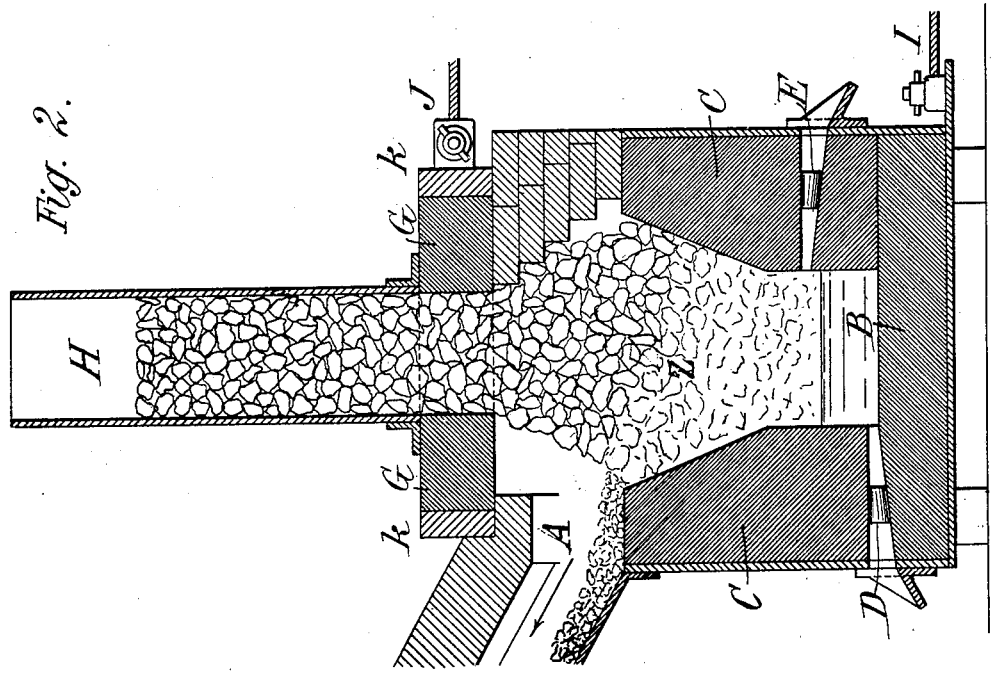
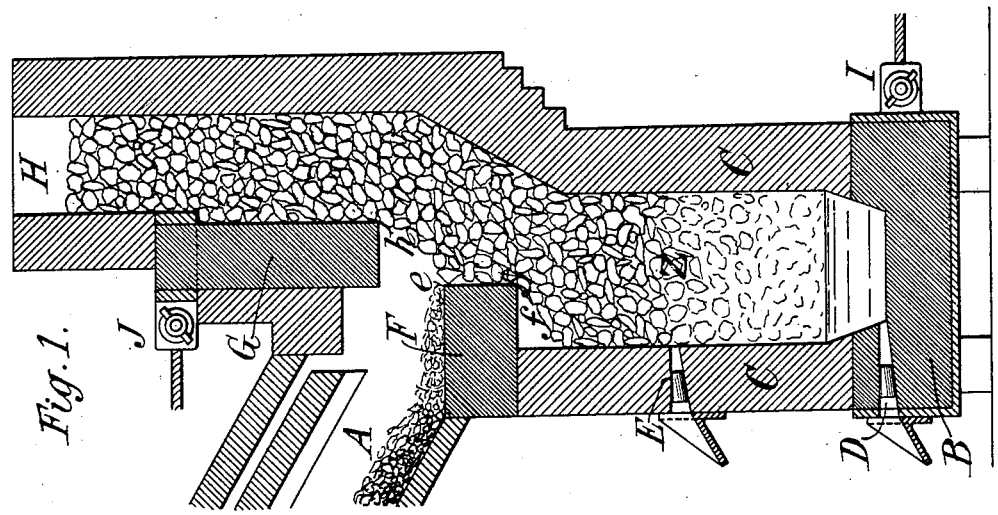
WITNESSES:
René Bruine
Thomas F Wallace
INVENTOR:
Paul Louis Toussaint Héroult
By his Attorneys
Arthur C. Fraser & Co.

No. 733,040. Patented July 7, 1903.

UNITED STATES PATENT OFFICE.

PAUL LOUIS TOUSSAINT HÉROULT, OF LA PRAZ, FRANCE.

ELECTRIC FURNACE.

SPECIFICATION forming part of Letters Patent No. 733,040, dated July 7, 1903.

Application filed March 27, 1902. Serial No. 100,336. (No model.)

*To all whom it may concern:*

Be it known that I, PAUL LOUIS TOUSSAINT HÉROULT, a citizen of the Republic of France, residing in La Praz, Savoy, France, have invented certain new and useful Improvements in Electric Furnaces, of which the following is a specification.

The electric furnace which forms the object of the present application for patent is arranged for the treatment of ores previously fused or in a pasty condition or sufficiently softened to descend progressively into the well of the furnace where the reduction of the ore takes place. This well, lined internally with refractory material, contains a column suitably high of coke or other fuel, a good conductor of electricity, through which passes the electric current and with which becomes mixed the ore fused or pasty as it comes from the adjoining furnace for preparing it. As the carbon disappears in reducing the ore the coke column is fed at the top from a reserve contained in the upper part of the furnace. The fuel through which the electric current passes, causing reduction of the ore and which really forms one of the electrodes of the furnace, therefore flows into the furnace in a continuous manner as the operation goes on. The lower contact for the passage of the electric current consists of the crucible or the furnace-hearth of carbon, and the upper contact is formed by one or more carbon blocks arranged above the well where the reduction of the ore takes place. These upper carbon blocks seldom require to be replaced if they are shielded from the air, a condition which is naturally fulfilled by the fact that these blocks arranged in the furnace are always surrounded by the gases of reduction.

Having thus explained the principle of this electric furnace with flowing electrode, there will be described, by way of example, two forms of it with reference to the annexed drawings.

Figure 1 is a section of a furnace suited especially for the production of cast-iron, ferrosilicon, ferromanganese, and other like products. Fig. 2 is a similar section of another embodiment of the invention.

As has been already explained, this apparatus is not intended to operate alone. It has to be supplied with ore already fused or rendered pasty in an adjacent furnace A, which may be of the kind which has already been patented on the 13th of November, 1900, No. 303,373.

A carbon crucible B, made like ordinary electric furnaces, is surmounted by a well C, having walls of refractory material intended to inclose the active portion of the carbon column and also the slag. The crucible B has a tap-hole D for issue of the molten metal, and through the wall is a hole E for issue of slag. For convenience of drawing these two outlets D and E are shown in one vertical line; but they may be otherwise arranged, as may be required. On the top of one of the walls of C is placed a block F, of carbon, which may be termed a "false electrode" and which forms the floor of the preparatory furnace A, which has an inclined or horizontal floor of certain length and which serves for superheating the ore. On this block F or false electrode spreads the fused ore as it comes from the furnace A. As this block extends into the well C, the fused ore is led on it into the heart of the coke column. It is to be noted that owing to the admission of the fused or pasty ore into the heart of the coke column Z there is no contact of the brickwork with the slag, which accompanies the ore and is not separated from it. The block F, moreover, can be easily replaced when it is worn out.

The terminals of the source of electricity are connected, the one to the crucible B at I, the other at J to the block G, on which the fuel rubs as it flows or descends into the well, the form of this block G being varied, if necessary, to insure the passage of the electric current by the column of fuel. Thus it may have the form of a ring or of a horseshoe. As shown in the drawings, it is supposed that this block G is lengthened to constitute one of the walls of the upper structure H, through which the fuel is fed. Furthermore, the block or false electrode F establishes a short circuit with the block G through that portion of the carbon column which is above the well, so that there are two points $e$ and $f$ of intense heat. Owing to the intense heat at $e$ the floor which the block F forms is cleared from the fused or pasty ore at $f$, so that at this point there can be no accumulation of ore which might obstruct the column. On the other hand, at $h$ there is obtained a high temperature which superheats the descending carbon. The upper contact J, to which the conductor is attached, is sufficiently far from the hot points $e\ f\ h$.

The gases evolved from the reduction of the ore escape by the passage between the blocks F and G into the preparatory furnace.

The operation of the furnace may be readily understood. The coke column being heated to incandescence by the passage of the electric current, the ore is advanced along the floor to $e$, whence it falls to $f$ and spreads through the carbon pieces, becoming reduced as it descends. The metal flows to the bottom and collects in the crucible B, while the slag floats above. The gases ascend and pass out between $e$ and $h$ into the preparatory furnace A, where the ore is melted or at least softened or rendered pasty. If there are in the well of the furnace portions of the coke column which are not bathed with ore, these portions are nevertheless of use because the reduction-gases are superheated by contact with them and carry the heat thus imparted to them into the preparatory furnace. Also if after tapping the level of the liquid metal is lowered the coke or carbon absorbs heat, which it utilizes when the level rises again.

Fig. 2 shows a modification, in which the walls C of the well are preferably of carbon and the coke column Z is in contact, on the one hand, with the carbon crucible B and, on the other hand, with the upper conducting-block G of carbon. This block G is held in a metal ring $k$, to which the contact J for the conductor is fixed. The block G has through it a hole for passage of the coke column H. The ore, fused or softened, descends, as before, from the preparatory furnace A, where it is reheated by the reduction-gases.

Having thus described the nature of this invention and the best means I know of carrying the same into practical effect, I claim—

1. An electric furnace comprising a well of refractory material in which is effected reduction of ore, means for introducing ore into the furnace at a temperature so high as to bring it to at least a pasty condition, an electric terminal in the form of a carbon crucible at the bottom of the furnace, and a terminal in the form of a carbon block at the top, a passage being provided for the supply and maintenance of a column of coke or like fuel between said terminals, the electric current being conducted to the crucible and to the block above, and passing through the coke which fills the well of the furnace below the upper block, the fuel thus constituting a real electrode which is used up as the reduction of the ore goes on, this flowing electrode being constantly fed with fuel introduced through said passage.

2. The combination with an electric furnace comprising a well of refractory material in which is effected reduction of ore, of an adjacent preparatory furnace-chamber for such ore into which pass the hot gases produced by the reduction, which gases effect the heating and softening of the ore, and said preparatory chamber being arranged to feed the ore in this hot and soft condition to the mass of fuel which is contained in the well of the reducing-furnace, electric terminals above and below the fuel in said reducing-furnace arranged to pass a current therethrough, and an additional electrode at the lower edge of the inlet from the preparatory chamber, which terminal is below the upper terminal of the reducing-furnace, so as to produce, by reason of the short circuit which establishes itself between these two terminals, hot edges insuring the flow of the pasty or fused ore coming from the preparatory chamber, and to prevent obstruction of the fuel column.

3. An electric furnace comprising a well in which is effected reduction of ore, means for introducing ore at a high temperature and in at least a pasty condition, an electric terminal at the bottom of the furnace, a terminal at the top in the form of a carbon plate or block which forms the top of the well of the electric furnace, a passage being provided through said plate for the supply and maintenance of a column of coke or like fuel between said terminals, the electric current being conducted to the crucible and to the block above, and passing through the coke which fills the well of the furnace below the upper block, the fuel thus constituting a real electrode which is used up as the reduction of the ore goes on, this flowing electrode being constantly fed with fuel introduced through said passage.

In witness whereof I have hereunto signed my name in the presence of two subscribing witnesses.

PAUL LOUIS TOUSSAINT HÉROULT.

Witnesses:
 EDWARD P. MACLEAN,
 CHARLES MARDELET.